A. L. BROOMALL.
DYNAMO ELECTRIC MACHINE.
APPLICATION FILED FEB. 3, 1916.
1,300,243.
Patented Apr. 15, 1919.
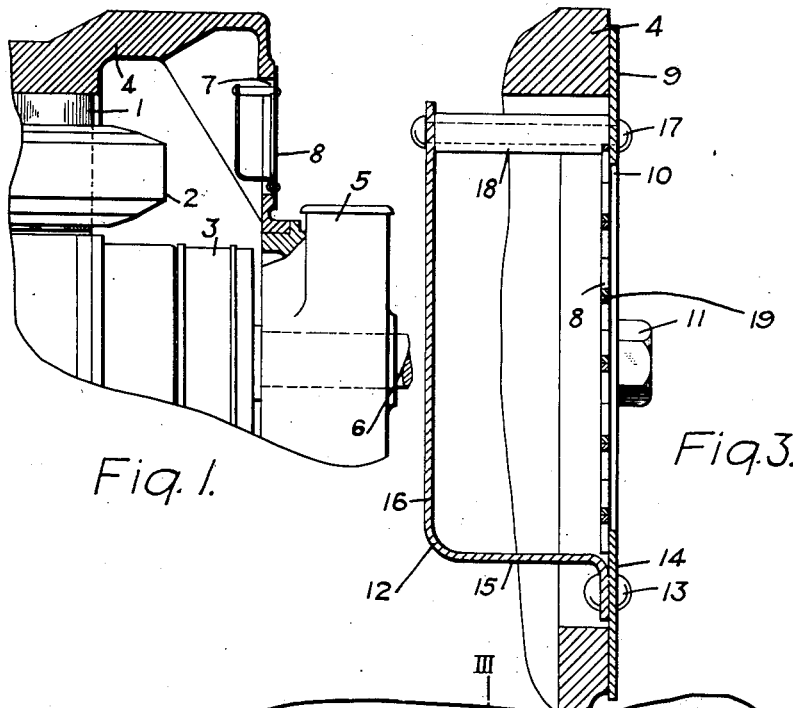
Fig. 1.
Fig. 3.
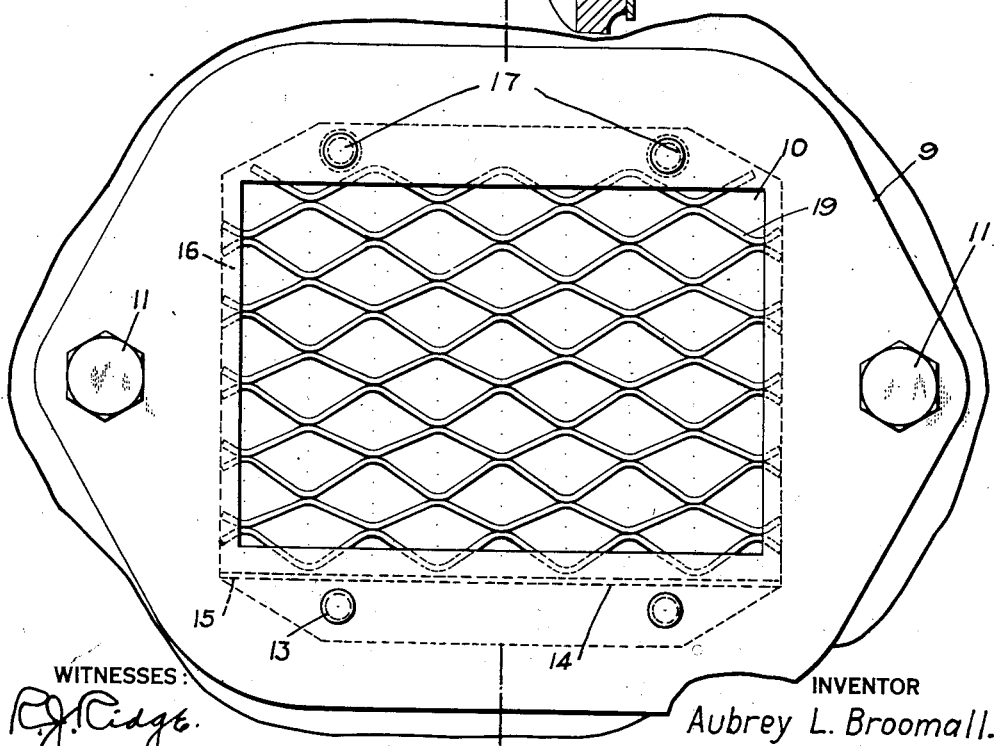
Fig. 2.
WITNESSES:
INVENTOR
Aubrey L. Broomall.
BY
ATTORNEY

UNITED STATES PATENT OFFICE.

AUBREY L. BROOMALL, OF WILKINSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,300,243.     Specification of Letters Patent.     Patented Apr. 15, 1919.

Application filed February 3, 1916. Serial No. 75,952.

*To all whom it may concern:*

Be it known that I, AUBREY L. BROOMALL, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines provided with ventilating openings, and it has for its object to provide a cover for such ventilating openings that will prevent any foreign matter which passes through the openings from impinging directly upon the current-carrying parts of the machine.

In the construction of electric motors of the inclosed type, it has been found desirable to arrange for the passage of a ventilating medium through the machines by providing suitable ventilating openings in the inclosing casings. Such ventilating openings have usually been located near the current-carrying parts and it has been found that, when the motor was operated in an exposed position, such as on an electric motor-driven vehicle, both dirt and moisture entered the machine through the ventilating openings and came into contact with the current-carrying parts. By my invention, I provide a cover for ventilating openings so constructed that the air passing therethrough is deflected away from the current-carrying parts.

In the accompanying drawing, Figure 1 is a fragmentary view of a dynamo-electric machine embodying my invention; Fig. 2 is a view, in front elevation, of a cover for ventilating openings constructed in accordance with my invention, and Fig. 3 is a sectional view along the line III—III of Fig. 2.

The dynamo-electric machine shown in Fig. 1 comprises a stationary magnetizable member 1 provided with a field-magnet winding 2 and a relatively rotatable armature member 3. The magnetizable member 1 is mounted within an inclosing frame 4 that is provided with bearings 5 in which the shaft 6 of the armature member 3 is rotatably mounted. The frame 4 is further provided with a ventilating opening 7 located adjacent to the field-magnet winding 2. As best shown in Figs. 2 and 3, the ventilating opening 7 is provided with a cover 8 that is secured to the frame 4 and projects within the opening 7. The cover 8 comprises a plate 9 that is provided with a central aperture 10 and is secured to the frame 4 by bolts 11. A substantially L-shaped baffle plate 12 is secured to the plate 9 by welding or by a suitable means, such, for example, as rivets 13 coacting with a flange 14 provided on the baffle plate. The short leg 15 of the baffle plate 12 extends at substantially right angles to the plane of the plate 9 while the other leg 16 lies in a plane that is parallel to the plate 9. The baffle 12 is further secured to the plate 9 by means of rivets 17 that extend through suitable tubular spacers 18 and are upset or expanded against the outer faces of the plate 9 and the baffle 12, respectively. The leg 16 of the baffle 12 is symmetrical with respect to the aperture 10 of the plate 9 and has somewhat greater outside dimensions than the aperture. The aperture 10 is provided with a screen 19 of expanded metal that is secured to the edges of the aperture 10 by welding or otherwise.

It is apparent from the foregoing and by referring to Fig. 1, that the air passing through the opening 7 of the frame 4 will impinge upon the baffle 12 will be deflected thereby in directions substantially parallel to the plane of the plate 9. As none of the ventilating air will pass directly through the opening 7, all dirt and moisture carried thereby will be kept away from the current-carrying parts of the machine. The intercrossing ribs of the expanded metal screen 19 will also serve to collect a certain amount of dirt and moisture and prevent it from entering the opening 7.

While I have shown my invention as applied to a particular type of dynamo-electric machine, it is not so limited but may be as readily applied to any electrical apparatus that is provided with ventilating openings adjacent to the current-carrying parts. I desire, therefore, that only such limitations shall be imposed as come within the scope of the appended claims.

I claim as my invention:

1. The combination with a dynamo-electric machine comprising magnetizable members provided with current-carrying conductors and an inclosing casing for said members provided with a ventilating opening, of a cover for said opening comprising a plate provided with an aperture and means carried by said plate for deflecting the air passing through said aperture around the edges thereof.

2. The combination with a dynamo-electric machine comprising magnetizable members provided with current-carrying conductors and an inclosing casing for said members provided with an opening adjacent to said conductors, of a cover for said opening comprising an apertured plate and means carried thereby for deflecting the air passing through said plate away from said conductors.

3. The combination with a dynamo-electric machine comprising magnetizable members provided with current-carrying conductors and an inclosing casing for said members provided with an opening adjacent to said conductors, of a cover for said opening comprising means for preventing the air passing through said opening from impinging directly upon said conductors.

4. The combination with a dynamo-electric machine comprising magnetizable members provided with current-carrying conductors and an inclosing casing for said members provided with an opening adjacent to said conductors, of a cover for said opening comprising an apertured plate and a baffle member carried thereby between said opening and said conductors.

5. The combination with a dynamo-electric machine comprising magnetizable members provided with current-carrying conductors and an inclosing casing for said members provided with an opening adjacent to said conductors, of a cover for said opening comprising an apertured plate and an L-shaped baffle member carried thereby for deflecting the air passing through said opening away from said conductors in a direction substantially parallel to the plane of said plate.

In testimony whereof I have hereunto subscribed my name this 29th day of Jan., 1916.

AUBREY L. BROOMALL.